United States Patent [19]

Romano

[11] Patent Number: 4,794,817

[45] Date of Patent: Jan. 3, 1989

[54] DEVICE ALLOWING BICYCLE PEDALS TO TAKE UP A STEADY POSITION WHEN THEY ARE NOT ENGAGED BY THE CYCLIST'S SHOE

[75] Inventor: Antonio Romano, Padova, Italy

[73] Assignee: Campagnolo S.p.A., Vicenza, Italy

[21] Appl. No.: 70,116

[22] Filed: Jul. 6, 1987

[30] Foreign Application Priority Data

Jul. 8, 1986 [IT] Italy ............................ 2247/86[U]

[51] Int. Cl.⁴ .............................................. G05G 1/14
[52] U.S. Cl. ................................ 74/594.6; 74/594.4
[58] Field of Search ............... 74/594.6, 594.4, 594.1, 74/594.7; 280/611; 36/131; D12/125

[56] References Cited

U.S. PATENT DOCUMENTS

| 351,880 | 11/1886 | Merrill | 74/594.6 |
|---|---|---|---|
| 535,065 | 3/1895 | Lester | 74/594.6 |
| 575,712 | 1/1897 | Hamilton et al. | 74/594.6 |
| 602,516 | 4/1898 | McDaniel | 74/594.6 |
| 616,167 | 12/1898 | Walker | 74/594.6 |
| 622,543 | 4/1899 | Scherff | 74/594.6 |
| 631,276 | 8/1899 | Bulova | 74/594.6 |
| 4,628,763 | 12/1986 | Konzorr | 74/594.6 |
| 4,646,586 | 3/1987 | Rapisarda | 74/594.6 |
| 4,665,767 | 5/1987 | Lassche | 74/594.6 |

FOREIGN PATENT DOCUMENTS 14326  5/1894  United Kingdom ............... 74/594.6

Primary Examiner—Gary L. Smith
Assistant Examiner—Vinh Luong
Attorney, Agent, or Firm—Young & Thompson

[57] ABSTRACT

A device allowing bicycle pedals to take up a steady position when they are not engaged by the cyclist's shoe comprises a knurled ring, formed on the pedal spindle, and a lever pivotally mounted on a pin parallel to the pedal spindle and positioned under the pedal body. The lever has a corresponding knurl at one end for engaging with the knurled ring under the action of a spring means, when the cyclist's shoe is not engaged with the pedal. The knurl is disengaged once the shoe engages the pedal.

1 Claim, 1 Drawing Sheet

DEVICE ALLOWING BICYCLE PEDALS TO TAKE UP A STEADY POSITION WHEN THEY ARE NOT ENGAGED BY THE CYCLIST'S SHOE

BACKGROUND OF THE INVENTION

It is known that in sports and competition bicycles the anchorage of the cyclist's shoe to the pedal must be particularly steady and precise and that, for this purpose, pedals have since long been provided with toe clips for housing the front part of the cyclist's shoe.

More recently, devices have been introduced for anchoring the sole of the cyclist's shoe to the pedal by means of a still plate fixed to the sole itself.

In both cases, however, when the pedal is free—i.e. not engaged by the cyclist's shoe—it tends to take up a strongly inclined position, owing to the weight of the toe clip or of the anchorage means, which make it totally unbalanced on one side. This causes quite a lot of inconveniences to cyclists who, in order to introduce their feet properly into the means for anchoring the shoes to the pedals—when getting on the bicycle or starting off—have to first cause a rotation of the pedals until they have taken up a suitable position, which is usually almost horizontal. This operation—which is relatively simple when having a certain experience, and if one has plenty of time and the required calm—can become very tiresome when it has to be carried out hastily and/or in particular psychological or emotional conditions, as it happens at the start of a competition and/or along its laps, and it can cause even considerable losses of time, which can prejudice the cyclist's performance in the competition and even determine more serious damages, like falls.

SUMMARY OF THE INVENTION

The device according to the invention has been conceived to avoid all the above inconveniences, as it allow bicycle pedals to take up a steady position when they are not engaged by the cyclist's shoe, so that the cyclist may promptly establish a correct engagement with the pedals, at any moment and without wasting time or risking to take up wrong postures. Said device is characterized in that it comprises a knurled ring, formed on the pedal spindle, and a lever, mounted oscillating on a pin parallel to the pedal spindle and positioned under the pedal body, which has a corresponding knurl at one end thereof, the knurl of said lever engaging with said knurled ring, thanks to the action of spring means, when the cyclist's shoe is not engaged with the pedal, while said engagement is removed once the shoe engages the pedal.

BRIEF DESCRIPTION OF THE DRAWING

The invention is now described in further detail, with reference to a preferred embodiment thereof, illustrated by way of example on the accompanying drawing, in which.

DESCRIPTION OF THE PREFERRED EMBODIMENT

Figure 1:
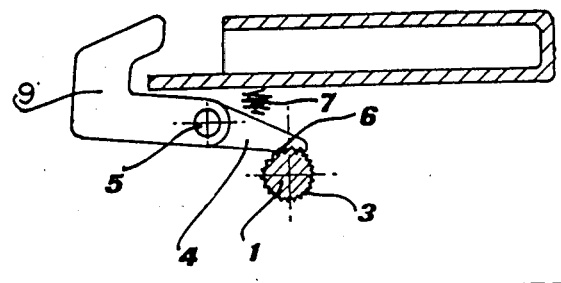
FIG. 1 diagrammatically illustrates the device according to the invention in a working position, with the pedal not engaged by the cyclist's shoe.

As shown in the drawings, the device according to the invention provides for the spindle 1 of the pedal 2 to comprise a knurled ring 3. A lever 4, mounted oscillating on a pin 5 parallel to the spindle 1 of the pedal 2 and positioned under the body of this latter, comprises a corresponding knurl 6 at one end thereof, with which the knurled ring 3 of the spindle 1 is brought into engagement by spring means 7 acting on said lever 4.

When the pedal is freed, said engagement takes place—as shown in FIG. 1—and it is more than sufficient to keep the pedal steady in the same position in which it has been left by the cyclist's foot before its removal; this provides the obvious advantage of finding the pedal ready in the most suitable position when having to set one's foot into it again.

Figure 2:
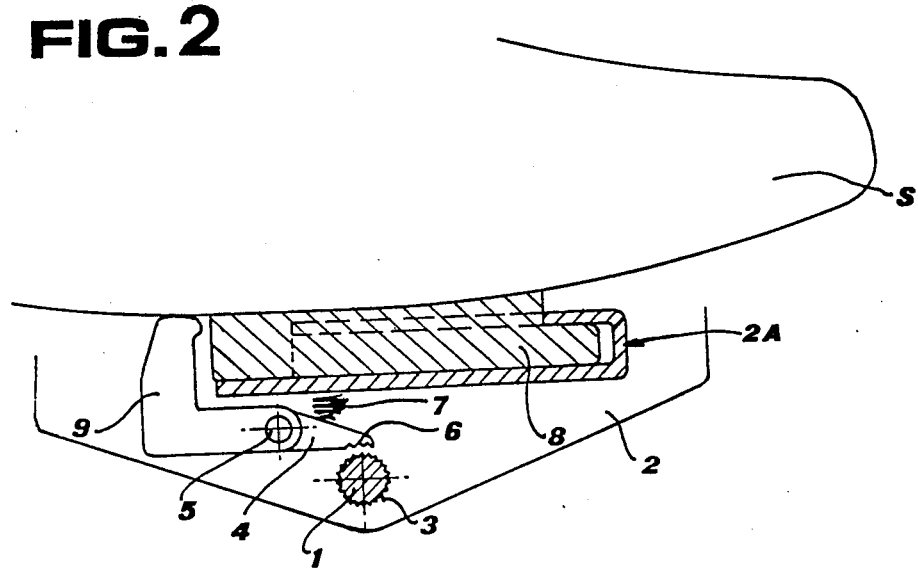
FIG. 2 illustrates the same device in a rest position, with the cyclist's shoe engaging the pedal.

As the cyclist's shoe S—which carries on the sole a stiff plate 8, apt to cooperate with the anchorage means 2A of the pedal 2—engages with its point the pedal 2 itself, it donwardly presses a profiled extension 9 of the lever 4 which oscillates, thereby removing the engagement between the knurl 6 and the knurled ring 3. This condition obviously continues also when the shoe reaches the position of steady engagement with the pedal 2—as shown in FIG. 2—since the extension 9 of the lever 4 remains pressed down by the shoe thanks to the action of the spring 7.

As seen, in the drawing the device is shown applied to a pedal 2 equipped with means 2A for anchoring the cyclist's shoe. However, the same device can also be applied, without introducing any substantial modifications, to pedals equipped with the conventional toe clips.

I claim:

1. In a bicycle pedal comprising a pedal frame, a pedal spindle on which said pedal frame is rotatably mounted, and means for receiving a cyclist's shoe on said pedal frame, the improvement comprising: a knurled segment borne by said pedal spindle; a lever means pivotally mounted on a pin means having a fixed axis on said pedal frame for pivotal movement relative to said pedal frame and said pedal spindle, said lever means having a first end comprising a knurled portion for engaging said knurled segment and a second end adapted to be contacted by a said cyclist's shoe received in said receiving means; and means urging said knurled portion into engagement with said knurled segment; whereby a said cyclist's shoe when received in said receiving means pivots said lever means against the action of said urging means to disengage said knurled portion and said knurled segment, said urging means engaging said knurled portion into engagement with said knurled segment when a said cyclist's shoe is not acting on said second end of said lever means.

* * * * *

UNITED STATES PATENT AND TRADEMARK OFFICE
CERTIFICATE OF CORRECTION

PATENT NO. : 4,794,817

DATED : Jan. 3, 1989

INVENTOR(S) : Antonio Romano

It is certified that error appears in the above-identified patent and that said Letters Patent is hereby corrected as shown below:

On the title page, item [30], Foreign Application Priority Data, "2247/86: should read --22476 B/86--.

Signed and Sealed this

Fourteenth Day of November, 1989

*Attest:*

JEFFREY M. SAMUELS

*Attesting Officer*      *Acting Commissioner of Patents and Trademarks*